Dec. 21, 1954  M. J. LEWIS  2,697,818
METER TERMINAL
Filed Sept. 24, 1951  2 Sheets-Sheet 1

INVENTOR
Morgan J. Lewis.
BY
ATTORNEYS.

Dec. 21, 1954 M. J. LEWIS 2,697,818
METER TERMINAL
Filed Sept. 24, 1951 2 Sheets-Sheet 2

INVENTOR
Morgan J. Lewis.
BY
ATTORNEYS.

United States Patent Office 2,697,818
Patented Dec. 21, 1954

2,697,818

METER TERMINAL

Morgan J. Lewis, Philadelphia, Pa.

Application September 24, 1951, Serial No. 248,038

1 Claim. (Cl. 339—198)

The present invention relates to meter terminals particularly of the character which are used for test purposes.

A purpose of the invention is to permit testing of a meter without longitudinally displacing the hairpin contacts.

A further purpose is to provide for insulating the screw which engages the lower end of the hairpin contact from that contact and using the same as a test screw.

A further purpose is to mount a wire clamp on one end of a terminal strip and to mount a test screw engaging one of the hairpin contacts at the other end.

A further purpose is to surround the terminal strip by a clamping band which engages and guides any lateral recess on the strip, and to force the band into clamping position by a clamping screw extending through the band threading on a nut inside the band and bringing pressure against the terminal strip.

Further purposes appear in the specification and in the claim.

In the drawings I have chosen to illustrate one only of the numerous embodiments in which my invention may appear, selecting the form shown from the standpoint of convenience in illustration, satisfactory operation and clear demonstration of the principles involved.

Figure 1:
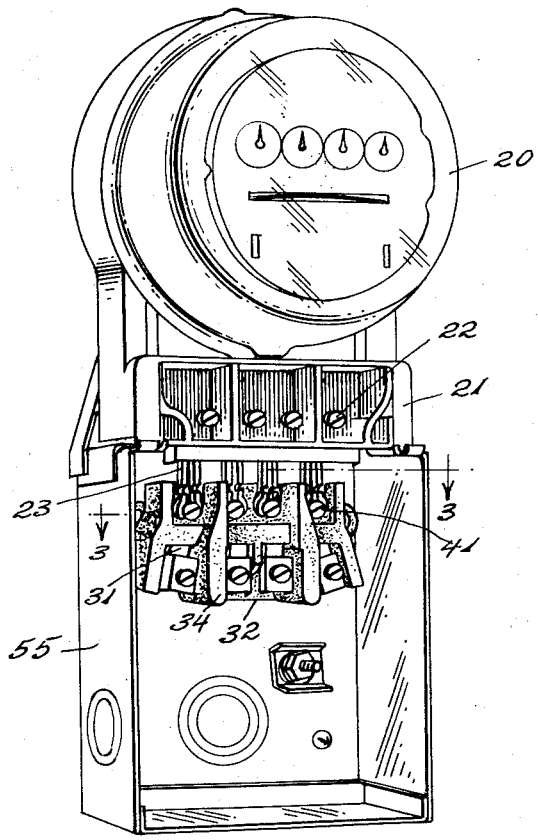
Figure 1 is a perspective of a meter, meter box and terminals embodying the principles of the invention.
Figure 2:
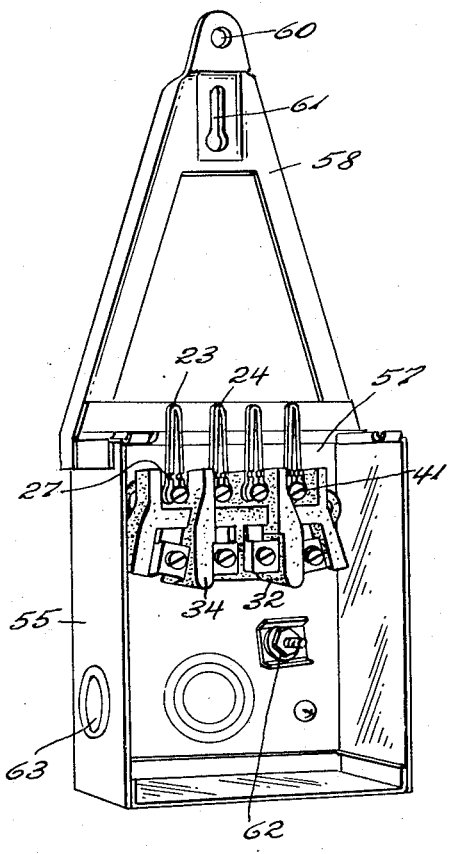
Figure 2 is a perspective of the structure of Figure 1, omitting the meter.
Figure 3:
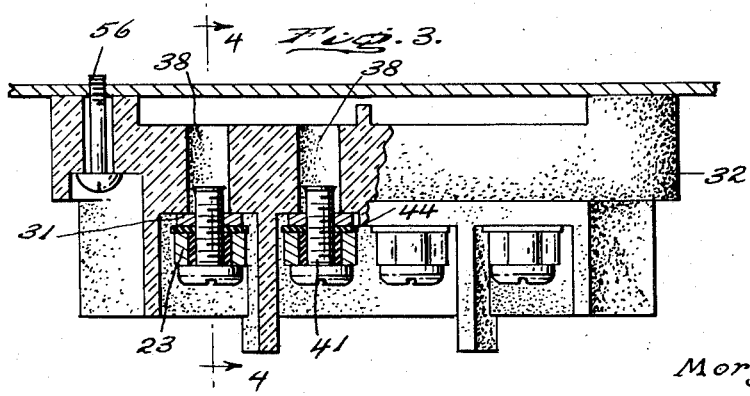
Figure 3 is an enlarged section on the line 3—3 of Figure 1.

Describing in illustration but not in limitation and referring to the drawings:

In present practice, A type meters are provided with connections through hairpin contacts which extend up into the meter and normally engage screws held in the meter. The hairpin contacts have in the prior art engaged terminal screws on a terminal block. In order to separate the meter from the terminal block for the purpose of testing the meter or otherwise, the terminal screws and the meter contact screws have been loosened, and then the hairpin contacts have been pushed up into the meter, detaching the meter from the terminal box. This procedure is troublesome and time consuming, and it is desirable to avoid the necessity of shifting the position of the hairpin contacts, while at the same time permitting the hairpin contacts to shift when the nature of the test is such that this extra precaution is considered necessary.

In accordance with the invention, the screw on the terminal block which engages between the open ends of the hairpin contact has been converted into a test screw by providing insulation under and around the screw, so that by loosening of the screw on the terminal end of the hairpin contact the meter can be disconnected.

At the same time, in accordance with the present invention, I desirably provide a simple, inexpensive and effective terminal clamp to the terminal strip which engages the hairpin contact. This terminal clamp desirably consists of a terminal band which is guided in recesses on the terminal strip, and which is urged into clamping position by a clamping screw passing through the clamping band, threaded in a nut inside the clamping band, and engaging at the end against the terminal strip.

Figure 4:
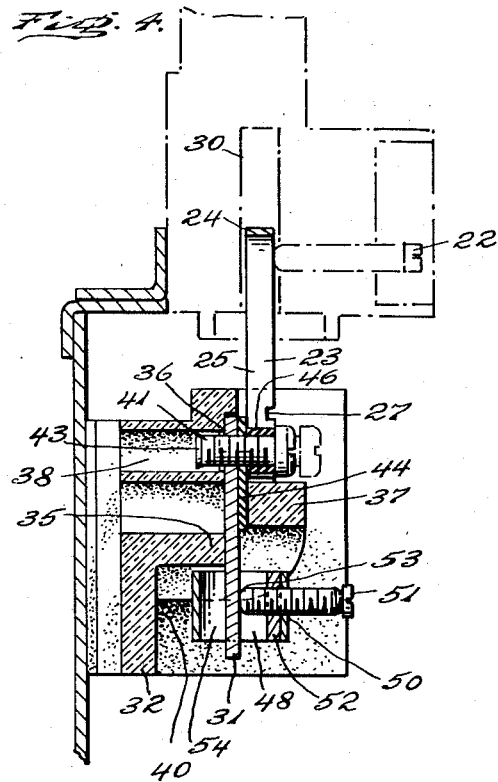
Figure 4 is a section on the line 4—4 of Figure 3, showing a portion of the meter in phantom, and also showing the test screw partially retracted in phantom.

The drawings illustrate a meter 20 having a transverse downwardly extending contacting portion 21 familiar in A-type meter construction, provided with meter contact screws 22 on each of the lines which extend horizontally into the contact portion of the meter and individually engage near the reverse bend ends as shown in Figure 4 on hairpin contacts 23 as best shown in Figures 1 to 7 inclusive.

Figure 5:
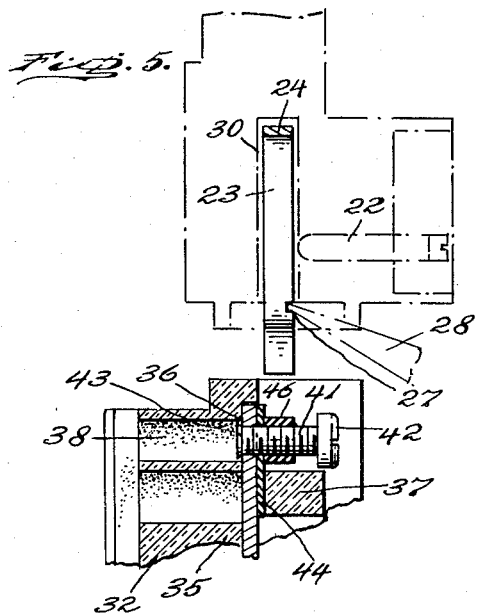
Figure 5 is a fragmentary view corresponding to Figure 4, showing the hairpin contacts pushed up into the meter.
Figure 6:
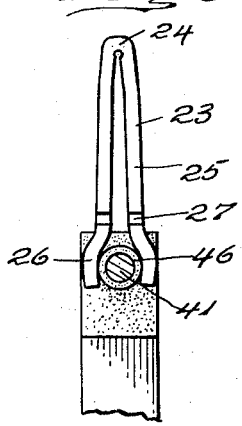
Figure 6 is a section on the line 6—6 of Figure 4.
Figure 7:
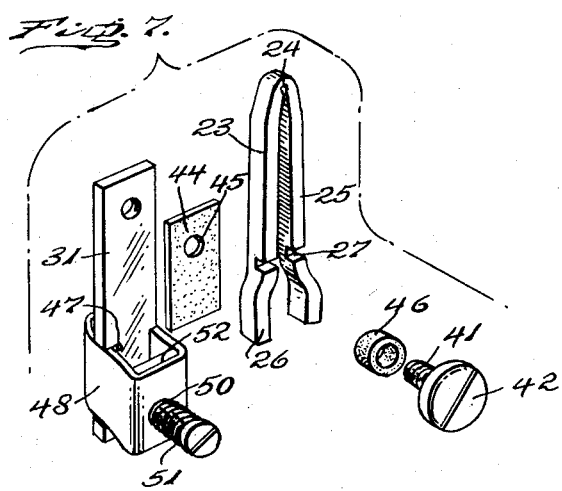
Figure 7 is an exploded perspective of the terminal and relating components.

Each of the hairpin contacts suitably has a somewhat pointed reverse bend end 24, and arms 25 which at the ends opposite from the reverse bend have screw engaging jaw portions 26 adapted to surround a test screw. Each hairpin contact has on each arm a notch 27 which is adapted to engage a screw driver or the like 28 to force the hairpin contact up into a recess 30 of the meter contact portion when the hairpin contact is separated from the terminal block as well known. At the time that the hairpin contact is raised as shown in Figure 5, the screws normally engaging both ends of the hairpin contact will be loosened.

In accordance with the present invention, the hairpin contacts individually make electrical connection with suitable metallic terminal strips 31, which desirably resiliently float in an insulating terminal block 32. Each terminal strip 31 is spaced from one or more laterally adjoining strips by an insulating rib 34 and is held in place by inner insulating ribs 35 and 36 and a spaced outer rib 37, there being a generally vertical channel between the inner and outer ribs for receiving the terminal strip.

The rib 36 has a test screw opening 38 at the position of each terminal strip and a recess is provided at 40 adjacent the lower end of each terminal strip to receive the clamp.

Suitably at the upper end of each terminal strip, a metallic test screw 41 is threaded through the terminal strip, and the test screw is provided with a wide head 42 for contact making purposes as later explained.

The screw is desirably staked at 43 so that it will not be completely unscrewed.

The test screw extends across the terminal strip above rib 37 and thus prevents the terminal strip, floating in the insulating block, from dropping out.

An insulating strip 44 has a hole 45 for placing between the jaw end 26 of each hairpin contact and terminal strip 31. An insulating sleeve 46 of a height substantially as great as the thickness of the hairpin contact surrounds the screw. The flat head 42 protrudes annularly around the sleeve 46 and engages the jaw end 26 when the screw is screwed down, but on retraction of the screw electrical contact from the terminal strip 31 to the hairpin contact is broken without the necessity of moving the hairpin contact up.

The terminal strip at its lower end suitably has guiding slots 47 at either side which receive and guide a band clamp 48, and the band clamp at its outer end suitably has an opening 50 which passes a clamping screw 51 into the threaded opening in a nut 52 inside the outer end of the band clamp. The inner end of screw 51 makes clamping engagement at 53 with the terminal strip so as to grip a wire or the like which enters at 54 between the band clamp and the opposite side of the terminal strip.

The terminal block is desirably mounted in a terminal box 55 as by screws 56, and the box is suitably provided with an opening 57 at its upper end through which the hairpin contacts pass to the meter. A triangular frame 58 above the box is provided with an opening 60 for mounting and a keyhole slot 61 to engage the meter. The terminal box is provided with a ground clamp 62 and with knockouts 63 to bring in the conduit or the like.

In operation, the meter is mounted in the usual manner, and contact from the terminal block is made by screwing the hairpin contacts in the manner shown in Figure 4. Wiring is connected to the terminal strips by tightening clamp screws 51.

When it is desired to disconnect one or more lines from the meter without moving the hairpin contacts, this is readily done by unscrewing the appropriate test screws 41. This breaks the circuit. If, however, it is desired to completely separate the hairpin contacts from the test screws, this can still be done, by loosening screw 22, as well as test screws 41, and forcing the hairpin contact up as shown in Figure 5 by means of screw driver 28 or a similar tool. The hairpin contact can then be held up by tightening screw 22.

It will be evident that the structure is comparatively resilient and will be less likely to break the insulation than a rigid structure because the terminal strip is floating.

It will be evident that all of the electrical contacting parts including the screws, clamping bands, terminal strips, hairpin contacts, and the like will suitably be made of metal or alloy having good electrical conductivity such as beryllium copper, bronze, brass, aluminum alloy, or the like.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

In a meter terminal, an insulating block having a plurality of passages each extending between a pair of spaced inside ribs and an outside rib, a terminal strip in each of the passages, a test screw threaded through each terminal strip above the outside rib, an insulating strip on the outside of the terminal strip and extending under the outside rib, an insulating sleeve surrounding the test screw, the test screw thus serving to prevent the terminal strip from dropping out of the terminal block, and a terminal clamp on the opposite end of the terminal strip from the test screw.

References Cited in the file of this patent

UNITED STATES PATENTS

| Number | Name | Date |
|---|---|---|
| 2,036,366 | Shore | Apr. 7, 1936 |
| 2,092,631 | Bakke | Sept. 7, 1937 |
| 2,094,356 | Hagist | Sept. 28, 1937 |

FOREIGN PATENTS

| Number | Country | Date |
|---|---|---|
| 455,205 | Great Britain | Oct. 15, 1936 |